(12) United States Patent
Ge et al.

(10) Patent No.: US 11,691,593 B2
(45) Date of Patent: Jul. 4, 2023

(54) ENGAGING AND DISENGAGING DEVICE, SEAT BELT RETRACTOR, AND SEAT BELT ASSEMBLY

(71) Applicant: Autoliv Development AB, Vårgårda (SE)

(72) Inventors: Liang Ge, Shanghai (CN); Weijing Liu, Shanghai (CN); Jie Wang, Shanghai (CN)

(73) Assignee: AUTOLIV DEVELOPMENT AB, Vargarda (SE)

( * ) Notice: Subject to any disclaimer, the term of this patent is extended or adjusted under 35 U.S.C. 154(b) by 370 days.

(21) Appl. No.: 17/053,028

(22) PCT Filed: Apr. 24, 2019

(86) PCT No.: PCT/CN2019/084069
§ 371 (c)(1),
(2) Date: Nov. 4, 2020

(87) PCT Pub. No.: WO2019/214436
PCT Pub. Date: Nov. 14, 2019

(65) Prior Publication Data
US 2021/0237680 A1 Aug. 5, 2021

(30) Foreign Application Priority Data
May 9, 2018 (CN) .......................... 201810438309.7

(51) Int. Cl.
*B60R 22/46* (2006.01)

(52) U.S. Cl.
CPC ........ *B60R 22/46* (2013.01); *B60R 2022/468* (2013.01)

(58) Field of Classification Search
CPC .... B60R 22/34; B60R 22/46; B60R 2022/468
See application file for complete search history.

(56) References Cited

U.S. PATENT DOCUMENTS

| 5,451,008 A * | 9/1995 | Hamaue | B60R 22/4628 242/374 |
| 6,443,380 B1 * | 9/2002 | Biller | F16D 25/087 280/806 |
| 8,561,932 B2 * | 10/2013 | Holbein | F16D 7/022 242/394.1 |

FOREIGN PATENT DOCUMENTS

| CN | 201034057 Y | 3/2008 |
| CN | 104760566 A | 7/2015 |
| CN | 204641662 U | 9/2015 |
| JP | H11227566 A | 8/1999 |

* cited by examiner

Primary Examiner — Sang K Kim
(74) Attorney, Agent, or Firm — Dickinson Wright PLLC

(57) ABSTRACT

An engagement and disengagement device used in a seat belt retractor includes a first rotating member and a second rotating member configured to be coaxial, and a transmission member disposed between the first and second rotating members. The first rotating member defines an engagement portion on a radial inner surface thereof, and the distance from the engagement portion to an axis of rotation gradually increases in a first direction of rotation. The transmission member can rotate between an engagement position and a non-engagement position relative to the first rotating member.

19 Claims, 2 Drawing Sheets

ENGAGING AND DISENGAGING DEVICE, SEAT BELT RETRACTOR, AND SEAT BELT ASSEMBLY

TECHNICAL FIELD

The present invention relates to a seat belt retractor used in a vehicle. More specifically, the present invention relates to an engagement and disengagement device used in a seat belt retractor. In cases such as an emergency deceleration of a vehicle, the engagement and disengagement device rotates a seat belt reel in a winding direction by means of a driving unit, and can reversibly allow the seat belt reel to disengage from a driving device.

BACKGROUND

Existing seat belt retractors can provide functions such as pre-collision protection, man-machine interaction during driving, and comfort. Before a control unit determines that a vehicle may crash, an active seat belt retractor can retract a certain length of a seat belt by means of a motor so as to slightly bind a passenger; when the control unit determines that the risk of crashing disappears, the active seat belt retractor allows the seat belt to be freely pulled.

The motor of the seat belt retractor has small output torque. Therefore, clutches for seat belt retractors are mainly toothed clutches. Such clutches have a long engagement and disengagement delay, a great impact, and loud noise, and inner and outer teeth thereof are not synchronized.

Existing overrunning clutches employing balls are mainly classified into two categories: clutches having no cages and clutches having cages. In a clutch having no cage, balls are fixed in an inner ring or an outer ring, and an input end and an output end cannot completely disengage from each other. When the clutch is used in a seat belt, if the motor acts as an input end, motion control can be performed. However, because of incomplete disengagement, the seat belt is jammed if a passenger pulls or retracts the seat belt. In a clutch having a cage, inertia is mainly provided by the cage, engagement is performed when an input end is activated at a high speed, and the input end and an output end can completely disengage from each other. However, because inertia is required when performing engagement and disengagement, the input end needs to be activated at a high speed. When the clutch is used in a seat belt, the functions of comfort and man-machine interaction, which require low-speed activation, cannot be achieved.

Therefore, an improved engagement and disengagement device used in a seat belt retractor is needed.

SUMMARY

An objective of the present invention is to provide an engagement and disengagement device capable of engaging and disengaging at a low rotational speed, a seat belt retractor, and a seat belt assembly. An aspect of the present invention provides an engagement and disengagement device in which an input end and an output end are completely separated from each other after disengagement is performed, a seat belt retractor, and a seat belt assembly. Another aspect of the present invention provides an engagement and disengagement device in which a small impact is generated when performing engagement or disengagement, a seat belt retractor, and a seat belt assembly.

An aspect of the present invention provides an engagement and disengagement device used in a seat belt retractor, comprising: a first rotating member that can be driven to rotate around an axis of rotation; a second rotating member, wherein the second rotating member and the first rotating member are configured to be coaxial, and the second rotating member is used to be connected to a reel of the seat belt retractor in an anti-torsion manner; and a transmission member disposed between the first rotating member and the second rotating member, wherein the first rotating member can transmit, in a first direction of rotation, torque to the second rotating member via the transmission member, wherein the first rotating member defines an engagement portion on a radial inner surface thereof, the distance from the engagement portion to the axis of rotation gradually increases in the first direction of rotation, and the engagement portion is used to engage with the transmission member; and wherein the transmission member can rotate between an engagement position and a non-engagement position relative to the first rotating member, wherein when the transmission member is at the engagement position, the transmission member engages with both the first rotating member and the second rotating member, such that the first rotating member, the second rotating member, and the transmission member can rotate together; when the transmission member is at the non-engagement position, the transmission member does not engage with the first rotating member and the second rotating member, such that the first rotating member and the second rotating member can freely rotate relative to each other.

According to an embodiment of the present invention, the transmission member comprises a cage and a transmission element, and the transmission element is disposed in the cage, and can move radially in a space defined between the engagement portion of the first rotating member and a radial outer surface of the second rotating member.

According to an embodiment of the present invention, when the transmission member is at the engagement position, no radial gap exists both between the transmission element and the engagement portion of the first rotating member, and between the transmission element and the radial outer surface of the second rotating member.

According to an embodiment of the present invention, the transmission element is a rolling element.

According to an embodiment of the present invention, the cage has a ring shape, and is rotatably sleeved on the second rotating member.

According to an embodiment of the present invention, the cage defines a retaining portion; the transmission element is disposed in the retaining portion; the retaining portion restricts axial movement of the transmission element relative to the cage.

According to an embodiment of the present invention, the cage comprises a first position-limiting portion located on a radial outer surface thereof; the first rotating member comprises a second position-limiting portion located on the radial inner surface thereof; and the first position-limiting portion and the second position-limiting portion can work with each other to restrict an angle of rotation of the cage relative to the first rotating member.

According to an embodiment of the present invention, the first position-limiting portion is located on an axial side of the cage, and the second position-limiting portion is located on a corresponding axial side of the first rotating member, wherein the second position-limiting portion and the engagement portion are sequentially axially disposed, and the first position-limiting portion is axially located on an outer side of the engagement portion.

According to an embodiment of the present invention, the engagement and disengagement device further comprises a first elastic component connected to the cage so as to elastically retain the transmission element in a radial direction.

According to an embodiment of the present invention, the first elastic component is a torsion spring.

According to an embodiment of the present invention, the cage comprises two side rings and a plurality of connecting pieces, the plurality of connecting pieces being spaced apart in a circumferential direction, wherein the side rings and the connecting pieces define the retaining portion, and an end portion of the first elastic component is connected to the connecting pieces.

According to an embodiment of the present invention, the engagement and disengagement device further comprises a housing, wherein the housing defines an accommodation cavity to accommodate the first rotating member and the transmission member.

According to an embodiment of the present invention, the first rotating member is rotatably supported in the housing.

According to an embodiment of the present invention, the first rotating member comprises an annular recess extending axially; the housing comprises an annular protrusion extending axially; and the annular protrusion can be inserted into the annular recess so as to rotatably support the first rotating member.

According to an embodiment of the present invention, the engagement and disengagement device further comprises a cover plate connected to the housing so as to seal the accommodation cavity.

According to an embodiment of the present invention, the engagement and disengagement device further comprises a second elastic component disposed on an axial side of the transmission member away from the cover plate so as to apply a biasing force causing the transmission member to abut the cover plate.

According to an embodiment of the present invention, the second elastic component is a wave spring.

Another aspect of the present invention provides a seat belt retractor, comprising: the engagement and disengagement device according to the embodiment of the present invention; a driving device used to drive the first rotating member of the engagement and disengagement device to rotate around the axis of rotation; and a reel connected to the second rotating member of the engagement and disengagement device in an anti-torsion manner, wherein the reel can wind a seat belt when rotating in the first direction of rotation, and can unwind the seat belt when rotating in the second direction of rotation opposite to the first direction of rotation.

Another aspect of the present invention provides a seat belt assembly, comprising: a seat belt retractor, comprising: the engagement and disengagement device according to the embodiment of the present invention; a driving device used to drive the first rotating member of the engagement and disengagement device to rotate around the axis of rotation; and a reel connected to the second rotating member of the engagement and disengagement device in an anti-torsion manner; and a seat belt having one end portion fixed to the reel, wherein the reel can wind the seat belt when rotating in the first direction of rotation, and can unwind the seat belt when rotating in the second direction of rotation opposite to the first direction of rotation.

According to an embodiment of the present invention, when the engagement and disengagement device is in a disengaged state, the transmission element and the second rotating member are radially spaced apart from each other, such that an input end and an output end of the engagement and disengagement device can be completely separated from each other. In an initial stage of switching a state of the engagement and disengagement device, due to a frictional force between the cage and the cover plate, the transmission element can cause the first rotating member and the second rotating member to engage with each other at a smaller angle of rotation. Therefore, the engagement and disengagement device of the present invention can reduce an engagement and disengagement delay, so as to wind a seat belt more quickly to provide a passenger with protection. In addition, due to the frictional force between the cage and the cover plate, the engagement and disengagement device can also perform engagement and disengagement even at a low rotational speed of a motor, thereby reducing noise and an impact.

These and other aspects and advantages of the present invention will be clearer after the following detailed description of the present invention is read with reference to the accompanying drawings.

It should be understood that the foregoing introduction and the following detailed description are merely exemplary and illustrative, and are not intended to limit the invention to be protected.

DETAILED DESCRIPTION

Figure 1:
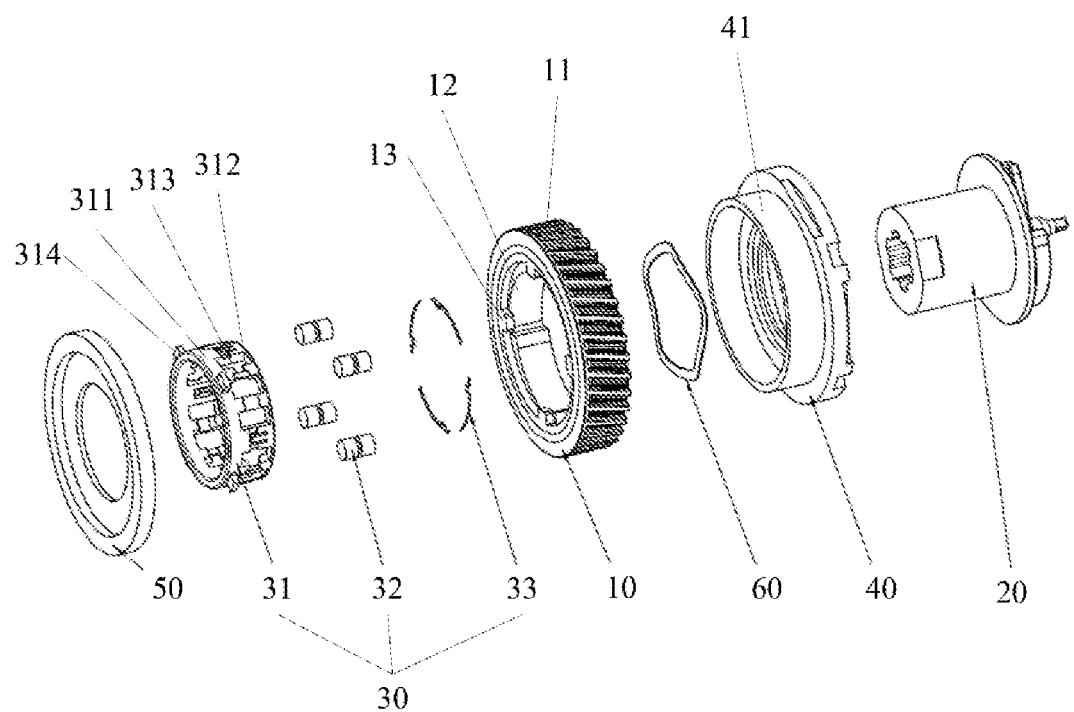
FIG. 1 is an exploded view of an engagement and disengagement device used in a seat belt retractor according to an embodiment of the present invention.

The embodiments of the present invention will be described below with reference to the drawings. The detailed description and drawings below are used exemplarily to illustrate the principles of the present invention. The present invention is not limited to the described preferred embodiments. The scope of the present invention is defined by the claims. The present invention is described in detail herein with reference to exemplary embodiments, and some embodiments are illustrated in the accompanying drawings. The following description is provided with reference to the accompanying drawings. Unless otherwise indicated, the same reference numerals in different accompanying drawings represent the same or similar elements. The solutions described in the following exemplary embodiments do not represent all of the solutions of the present invention. Instead, these solutions are merely examples of systems and methods according to aspects of the present invention involved in the appended claims.

FIG. 1 is an exploded view of an engagement and disengagement device used in a seat belt retractor according to an embodiment of the present invention. As shown in FIG.

1, the engagement and disengagement device can include a first rotating member 10, a second rotating member 20, and a transmission member 30.

The first rotating member 10 can be driven to rotate around an axis of rotation thereof. The first rotating member 10 can have a hollow structure, such that at least part of the second rotating member 20 passes therethrough. In some embodiments, the first rotating member 10 includes a toothed portion 11 located on an outer peripheral surface thereof. The toothed portion 11 can engage with a driving device of the seat belt retractor by means of a gear mechanism, such as by means of a worm gear and worm, a rack and pinion, or the like.

According to an embodiment of the present invention, the first rotating member 10 includes an engagement portion 12 defined on a radial inner surface thereof. In an exemplary embodiment, the first rotating member 10 defines a plurality of, for example four, engagement portions 12 on the radial inner surface thereof. The engagement portion 12 is used to engage with the transmission member 30.

The second rotating member 20 and the first rotating member 10 are configured to be coaxial. The second rotating member 20 can be connected to a reel of the seat belt retractor in an anti-torsion manner, so as to transmit torque to the reel. In an exemplary embodiment, at least part of a radial outer surface of the second rotating member 20 can engage with the transmission member 30.

The transmission member 30 is disposed between the first rotating member 10 and the second rotating member 20. In an exemplary embodiment, the transmission member 30 can include a cage 31 and a transmission element 32. The cage 31 is used to retain one or a plurality of transmission elements 32. In some embodiments, the number of transmission elements 32 is equal to the number of engagement portions 12. In some embodiments, the transmission element 32 can be a rolling element, such as a cylindrical roller, a needle roller, or the like.

In an exemplary embodiment, the cage 31 is annular, and can be rotatably sleeved on the second rotating member 20. In the exemplary embodiment shown in FIG. 1, the cage 31 can include two side rings 311 and 312 and a plurality of connecting pieces 313, the plurality of connecting pieces being spaced apart in a circumferential direction. The connecting pieces 313 are connected to the side rings 311 and 312. In some embodiments, the connecting pieces 313 can have identical intervals in the circumferential direction. The connecting pieces 313 and the side rings 311 and 312 define a plurality of retaining portions. The transmission element 32 can be disposed and retained in the retaining portion. The retaining portion of the cage 31 can restrict axial movement of the transmission element 32 relative to the cage 31, for example, by means of the two side rings 311 and 312.

According to an embodiment of the present invention, the radial distance from the engagement portion 12 of the first rotating member 10 to the axis of rotation gradually increases in a first direction of rotation (see description below). The transmission element 32 can move radially in a space defined between the engagement portion 12 of the first rotating member 10 and the radial outer surface of the second rotating member 20.

Figure 2:
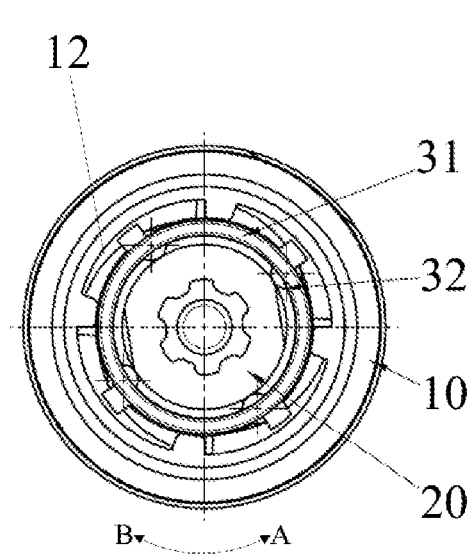
FIG. 2 is a side view of the engagement and disengagement device according to an embodiment of the present invention.
Figure 3:
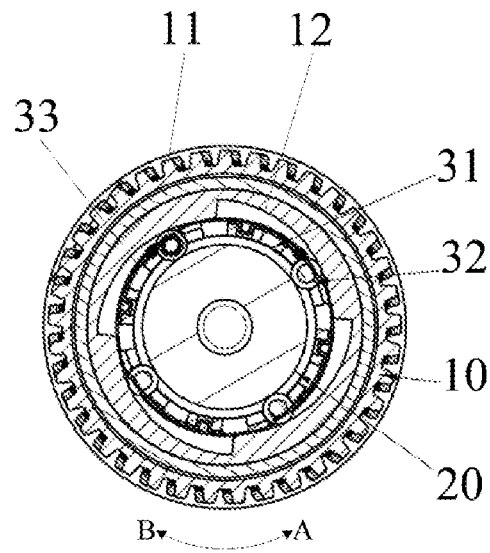
FIG. 3 is a cross-sectional view of the engagement and disengagement device according to an embodiment of the present invention.

FIG. 2 is a side view of the engagement and disengagement device according to an embodiment of the present invention. FIG. 3 is a cross-sectional view of the engagement and disengagement device according to an embodiment of the present invention. As shown in FIG. 2 and FIG. 3, the distance from the engagement portion 12 to the axis of rotation gradually increases in a first direction of rotation A (the counterclockwise direction). Viewed axially, the engagement portion 12 can have a shape of any appropriate curve, for example, an evolvent. FIG. 2 and FIG. 3 show that the engagement and disengagement device is in an engaged state, where the transmission element 32 of the transmission member 30 radially maintains in gapless engagement with both the first rotating member 10 (the engagement portion 12) and the radial outer surface of the second rotating member 20.

Figure 4:
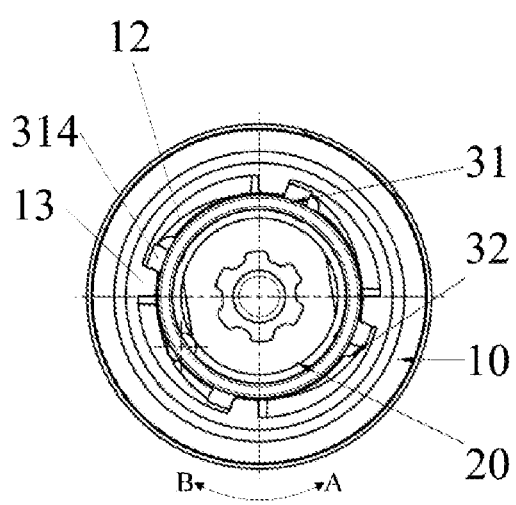
FIG. 4 is a side view of the engagement and disengagement device according to an embodiment of the present invention.
Figure 5:
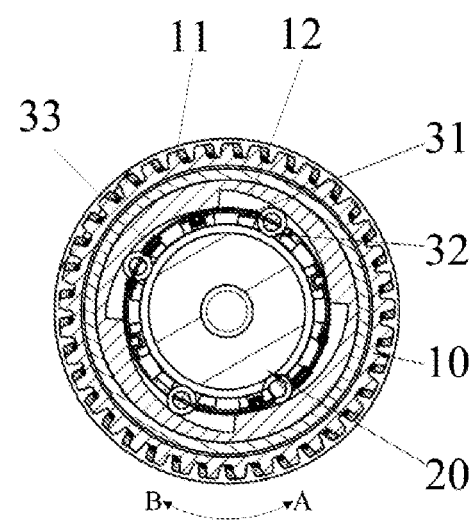
FIG. 5 is a cross-sectional view of the engagement and disengagement device according to an embodiment of the present invention.

FIG. 4 is a side view of the engagement and disengagement device according to an embodiment of the present invention. FIG. 5 is a cross-sectional view of the engagement and disengagement device according to an embodiment of the present invention. As shown in FIG. 4 and FIG. 5, the engagement and disengagement device is in a disengaged state, where the transmission element 32 of the transmission member 30 does not engage with the second rotating member 20.

The transmission member 30 can rotate between an engagement position and a non-engagement position relative to the first rotating member 10.

In the engaged state shown in FIG. 2 and FIG. 3, the transmission element 32 radially engages with both the first rotating member 10 (the engagement portion 12) and the second rotating member 20. When the first rotating member 10 rotates in the first direction of rotation A, the first rotating member 10 can transmit torque to the second rotating member 20 via the transmission member 30 (for example, the transmission element 32), such that the first rotating member 10, the transmission element 32, and the second rotating member 20 can rotate together.

In the engaged state of the engagement and disengagement device, when the first rotating member 10 rotates in a second direction of rotation B opposite to the first direction of rotation A, the transmission element 32 of the transmission member 30 can disengage from the second rotating member 20 (as shown in FIG. 4 and FIG. 5), such that the first rotating member 10 and the second rotating member 20 can freely rotate relative to each other.

According to some embodiments of the present invention, the transmission member 30 can further include an elastic component 33, so as to elastically retain the transmission element 32 in a radial direction. In some embodiments, the elastic component 33 can be a torsion spring. In an exemplary embodiment, the elastic component 33 can be connected to the cage 31. For example, an end portion of the elastic component 33 can be connected to the connecting piece 313 of the cage 31. In an exemplary embodiment, the elastic component 33 can outwardly apply a biasing force, in the radial direction, to the transmission element 32. The elastic component 33 can have any appropriate shape or size, as long as the elastic component 33 can radially support and reset the transmission element 32.

As shown in FIG. 3, in the engaged state, the transmission element 32 is subject to a force from the engagement portion 12, and thus overcomes the biasing force from the elastic component 33. Thus, the transmission element 32 moves inwardly, in a radial direction, to engage with the second rotating member 20. As shown in FIG. 5, in the disengaged state, the transmission element 32 is subject to the biasing force from the elastic component 33, and is spaced apart, in the radial direction, from the second rotating member 20.

According to an embodiment of the present invention, the engagement and disengagement device can further include a housing 40 and a cover plate 50, as shown in FIG. 1. The housing 40 defines an accommodation cavity, so as to accommodate the first rotating member 10 and the transmission member 30. The cover plate 50 can be connected to the housing 40 so as to seal the accommodation cavity. In an exemplary embodiment, the cover plate 50 can be fixed to an axial end surface of the housing 40 by means of, for example, a screw. The housing 40 and the cover plate 50 can each have a central through-hole, such that at least part of the second rotating member 20 can pass therethrough.

The housing 40 can serve as an axial bearing for the first rotating member 10, such that the first rotating member 10 can be rotatably supported in the housing 40. In some embodiments, the first rotating member 10 includes an annular recess (not shown) extending axially, and the housing 40 includes an annular protrusion 41 extending axially. The annular protrusion 41 of the housing 40 can be inserted into the annular recess of the first rotating member 10 so as to rotatably support the first rotating member 10.

According to some embodiments of the present invention, the cage 31 can further include a position-limiting portion 314 located on a radial outer surface thereof, and the first rotating member 10 can include a position-limiting portion 13 located on the radial inner surface thereof. The position-limiting portion 314 of the cage 31 and the position-limiting portion 13 of the first rotating member 10 can work with each other to restrict an angle of rotation of the cage 31 relative to the first rotating member 10. In an exemplary embodiment, the position-limiting portion 314 is located on an axial side (for example, the side close to the cover plate 50) of the cage 31, and the position-limiting portion 13 is located on a corresponding axial side of the first rotating member 10. As shown in FIG. 4, during operation of the engagement and disengagement device, when the position-limiting portion 314 and the position-limiting portion 13 abut each other, the first rotating member 10 and the cage 31 remain stationary relative to each other.

In an exemplary embodiment, the engagement portion 12 and the position-limiting portion 13 of the first rotating member 10 can be sequentially axially arranged, as shown in FIG. 1. In addition, the position-limiting portion 314 of the cage 31 is axially disposed on an outer side of the engagement portion. In this case, engagement between the first rotating member 10 and the transmission member 30 is not affected by the position-limiting portions.

According to an embodiment of the present invention, the engagement and disengagement device can further an elastic component 60. In an exemplary embodiment, the elastic component 60 is used to apply a biasing force causing the transmission member 30 to abut the cover plate 50. In some embodiments, the elastic component 60 can be axially disposed between the cage 31 of the transmission member 30 and the housing 40. In some embodiments, the elastic component 60 can be a wave spring. The elastic component 60 applies a biasing force to the transmission member 30, such that a frictional force is generated between the transmission member 30 and the cover plate 50. At the very beginning of rotation of the first rotating member 10, the elastic component 60 is subject to the frictional force and remains stationary, thereby facilitating rapid engagement or disengagement between the transmission member 30 and the second rotating member 20.

A method for operating the engagement and disengagement device according to an embodiment of the present invention will be described below.

When the engagement and disengagement device is in the disengaged state, as shown in FIG. 4 and FIG. 5, the transmission element 32 is circumferentially located in a position on the engagement portion 12 close to the toothed portion 11, and the transmission element 32 is, in a radial direction, outwardly subject to the biasing force from the elastic component 33, such that the transmission element 32 radially disengages from the second rotating member 20. When the disengaged state is switched to the engaged state, the first rotating member 10 is first driven by the driving device to rotate in the first direction of rotation A. Due to the biasing force from the elastic component 60, the transmission member 30 is subject to the frictional force between the transmission member 30 and the cover plate 50 so as to remain stationary during an initial stage. The engagement portion 12 of the first rotating member 10 is radially in gapless engagement with the transmission element 32 of the transmission member 30. As the first rotating member 10 rotates, the engagement portion 12 applies a force to the transmission element 32, such that the transmission element 32 radially and gradually approaches the radial outer surface of the second rotating member 20. When the transmission element 32 moves to be in gapless engagement with the radial outer surface of the second rotating member 20, the first rotating member 10 can drive, via the transmission element 32, the second rotating member 20 to rotate, such that the engagement and disengagement device is in the engaged state, as shown in FIG. 2 and FIG. 3.

When the engagement and disengagement device is in the disengaged state, as shown in FIG. 2 and FIG. 3, the transmission element 32 is circumferentially located in a position on the engagement portion 12 away from the toothed portion 11. The transmission element 32 engages with the engagement portion 12, and is radially inwardly subject to the force from the engagement portion 12, so as to overcome the biasing force from the elastic component 33 and radially engage with the second rotating member 20. When the engaged state is switched to the disengaged state, the first rotating member 10 is first driven by the driving device to rotate in the second direction of rotation B. Due to the biasing force from the elastic component 60, the transmission member 30 is subject to the frictional force between the transmission member 30 and the cover plate 50 so as to remain stationary during an initial stage. As the first rotating member 10 rotates, the elastic component 33 outwardly applies a biasing force, in the radial direction, to the transmission element 32, such that the transmission element 32 radially and gradually leaves the radial outer surface of the second rotating member 20. When the transmission element 32 moves to disengage from the radial outer surface of the second rotating member 20, the first rotating member 10 and the second rotating member 20 can freely rotate relative to each other, such that the engagement and disengagement device is in the disengaged state, as shown in FIG. 4 and FIG. 5.

The transmission element in the above description is a rolling element. However, the present invention is not limited thereto. According to an embodiment of the present invention, the transmission element can also be in other forms, such as a wedge.

The transmission element in the above description is retained by the cage. However, the present invention is not limited thereto. According to an embodiment of the present invention, the transmission element can also be retained by the first rotating member or the second rotating member. For example, the elastic component 33 of the transmission member 30 can be connected to the first rotating member 10 or the second rotating member 20, such that the transmission element 32 is retained via a radial biasing force thereof.

The above describes that when the engagement and disengagement device is in the disengaged state, the transmission element 32 of the transmission member 30 does not engage with the second rotating member 20. However, the present invention is not limited thereto. According to an embodiment of the present invention, the engagement and disengagement device can also be configured such that when the engagement and disengagement device is in the disengaged state, the transmission element 32 does not engage with the first rotating member 10 (for example, the engagement portion 12). For example, the elastic component 33 can inwardly apply a biasing force, in a radial direction, to the transmission element 32. When the first rotating member 10 rotates in the second direction of rotation, the transmission element 32 radially and gradually leaves the engagement portion 12 of the first rotating member 10, such that the engagement and disengagement device is in the disengaged state.

The engagement and disengagement device according to the embodiment of the present invention can be applied to a seat belt retractor. The seat belt retractor can include the aforementioned engagement and disengagement device, a driving device, and a reel. The driving device is used to drive the first rotating member 10 of the engagement and disengagement device to rotate around the axis of rotation. In an exemplary embodiment, the driving device can be a motor. For example, the motor can drive, via a gear mechanism (equivalent to a worm gear and worm, a rack and pinion, or the like), the first rotating member 10 to rotate. The reel is connected to the second rotating member 20 of the engagement and disengagement device in an anti-torsion manner, and a seat belt can be wound around the reel. The reel can wind the seat belt when rotating in the first direction of rotation, and can unwind the seat belt when rotating in the second direction of rotation opposite to the first direction of rotation. During operation, when the driving device drives the first rotating member 10 to rotate in the first direction of rotation, the first rotating member 10 drives, via the transmission member 30 of the engagement and disengagement device, the second rotating member 20 and the reel to rotate, so as wind a certain length of the seat belt around the reel; when the driving device drives the first rotating member 10 to rotate in the second direction of rotation, the first rotating member 10 and the second rotating member 20 disengage from each other so as to be capable of freely rotating relative to each other, such that a passenger can freely pull the seat belt.

The engagement and disengagement device according to the embodiment of the present invention can be applied to a seat belt assembly. The seat belt assembly can include the aforementioned seat belt retractor and a seat belt, and one end portion of the seat belt is fixed to the reel of the seat belt retractor.

The mention of "one embodiment" or "an embodiment" in the description indicates that the specific features, structures, or properties described with reference to embodiments are included in at least one embodiment. Therefore, the terms or variants thereof used in the whole description do not necessarily refer to the same embodiment.

Although the present invention has already been described with reference to the exemplary embodiments, it shall be understood that the present invention is not limited to the constructions and methods described in the above-mentioned embodiments. Contrarily, the present invention intends to cover various modification examples and equivalent configurations. In addition, although various elements and method steps of the disclosed invention are described in various exemplary combinations and constructions, other combinations comprising more or fewer elements or methods also fall into the scope of the present invention.

The invention claimed is:

1. An engagement and disengagement device used in a seat belt retractor, comprising:
 a first rotating member which can be driven to rotate around an axis of rotation;
 a second rotating member, wherein the second rotating member and the first rotating member are configured to be coaxial, and the second rotating member is used to be connected to a reel of the seat belt retractor; and
 a transmission member disposed between the first rotating member and the second rotating member, wherein the first rotating member can transmit, in a first direction of rotation, torque to the second rotating member via the transmission member,
 wherein the first rotating member defines an engagement portion on a radial inner surface thereof, the distance from the engagement portion to the axis of rotation gradually increases in the first direction of rotation, and the engagement portion is used to engage with the transmission member; and
 wherein the transmission member can rotate between an engagement position and a non-engagement position relative to the first rotating member, wherein when the transmission member is at the engagement position, the transmission member engages with both the first rotating member and the second rotating member, such that the first rotating member, the second rotating member, and the transmission member can rotate together; when the transmission member is at the non-engagement position, the transmission member does not engage with the first rotating member and the second rotating member, such that the first rotating member and the second rotating member can freely rotate relative to each other.

2. The engagement and disengagement device according to claim 1, wherein the transmission member comprises a cage and a transmission element, and the transmission element is disposed in the cage, and can move radially in a space defined between the engagement portion of the first rotating member and a radial outer surface of the second rotating member.

3. The engagement and disengagement device according to claim 2, wherein when the transmission member is at the engagement position, no radial gap exists both between the transmission element and the engagement portion of the first rotating member, and between the transmission element and the radial outer surface of the second rotating member.

4. The engagement and disengagement device according to 3, wherein the transmission element is a rolling element.

5. The engagement and disengagement device according to claim 2, wherein the cage has a ring shape, and is rotatably sleeved on the second rotating member.

6. The engagement and disengagement device according to claim 5, wherein the cage defines a retaining portion; the transmission element is disposed in the retaining portion; the retaining portion restricts axial movement of the transmission element relative to the cage.

7. The engagement and disengagement device according to claim 6, wherein the cage comprises a first position-limiting portion located on a radial outer surface thereof; the first rotating member comprises a second position-limiting portion located on the radial inner surface thereof; and the first position-limiting portion and the second position-limiting portion can work with each other to restrict an angle of rotation of the cage relative to the first rotating member.

8. The engagement and disengagement device according to claim 7, wherein the first position-limiting portion is located on an axial side of the cage, and the second position-limiting portion is located on a corresponding axial side of the first rotating member,
  wherein the second position-limiting portion and the engagement portion are sequentially axially disposed, and the first position-limiting portion is axially located on an outer side of the engagement portion.

9. The engagement and disengagement device according to claim 2, further comprising a first elastic component connected to the cage so as to elastically retain the transmission element in a radial direction.

10. The engagement and disengagement device according to claim 9, wherein the first elastic component is a torsion spring.

11. The engagement and disengagement device according to claim 9, wherein the cage comprises two side rings and a plurality of connecting pieces, the plurality of connecting pieces being spaced apart in a circumferential direction, wherein the side rings and the connecting pieces define the retaining portion, and an end portion of the first elastic component is connected to the connecting pieces.

12. The engagement and disengagement device according to claim 1, further comprising a housing, wherein the housing defines an accommodation cavity to accommodate the first rotating member and the transmission member.

13. The engagement and disengagement device according to claim 12, wherein the first rotating member is rotatably supported in the housing.

14. The engagement and disengagement device according to claim 12, wherein the first rotating member comprises an annular recess extending axially; the housing comprises an annular protrusion extending axially; and the annular protrusion can be inserted into the annular recess so as to rotatably support the first rotating member.

15. The engagement and disengagement device according to claim 12, further comprising a cover plate connected to the housing so as to seal the accommodation cavity.

16. The engagement and disengagement device according to claim 15, further comprising a second elastic component disposed on an axial side of the transmission member away from the cover plate so as to apply a biasing force causing the transmission member to abut the cover plate.

17. The engagement and disengagement device according to claim 16, wherein the second elastic component is a wave spring.

18. A seat belt retractor, comprising:
  the engagement and disengagement device according to claim 1;
  a driving device used to drive the first rotating member of the engagement and disengagement device to rotate around the axis of rotation; and
  a reel connected to the second rotating member of the engagement and disengagement device, wherein the reel can wind a seat belt when rotating in the first direction of rotation, and can unwind the seat belt when rotating in the second direction of rotation opposite to the first direction of rotation.

19. A seat belt assembly, comprising:
  a seat belt retractor, comprising:
    the engagement and disengagement device according to claim 1;
    a driving device used to drive the first rotating member of the engagement and disengagement device to rotate around the axis of rotation; and
    a reel connected to the second rotating member of the engagement and disengagement device; and
  a seat belt having one end portion fixed to the reel,
    wherein the reel can wind the seat belt when rotating in the first direction of rotation, and can unwind the seat belt when rotating in the second direction of rotation opposite to the first direction of rotation.

* * * * *